United States Patent [19]
Ishikawa et al.

[11] Patent Number: 5,043,146
[45] Date of Patent: Aug. 27, 1991

[54] DENITRATION REACTOR

[75] Inventors: Tomihisa Ishikawa; Masato Mukai, both of Kure; Toshimichi Wada, Hiroshima; Kozo Matoba, Kure, all of Japan

[73] Assignee: Babcock-Hitachi Kabushiki Kaisha, Tokyo, Japan

[21] Appl. No.: 268,596

[22] Filed: Nov. 7, 1988

[30] Foreign Application Priority Data

Nov. 12, 1987 [JP] Japan .................... 62-284118

[51] Int. Cl.⁵ .................................. F01N 3/08
[52] U.S. Cl. ..................... 422/176; 422/177; 422/220; 422/222
[58] Field of Search ............. 422/176, 177, 220, 222; 60/299, 301

[56] References Cited

U.S. PATENT DOCUMENTS

| | | | |
|---|---|---|---|
| 3,880,597 | 4/1975 | Goldschmidt et al. | 422/176 |
| 4,213,766 | 7/1980 | Wyatt | 422/176 |
| 4,322,386 | 3/1982 | Masutomi et al. | 422/171 |
| 4,471,821 | 9/1984 | Coulon et al. | 422/220 |
| 4,544,526 | 10/1985 | Billings | 422/176 |
| 4,726,935 | 2/1988 | Inatsune et al. | 422/171 |

FOREIGN PATENT DOCUMENTS

| | | |
|---|---|---|
| 163001 | 12/1985 | European Pat. Off. . |
| 2311475 | 10/1973 | Fed. Rep. of Germany . |
| 9470 | 1/1974 | Japan . |
| 40869 | 11/1976 | Japan . |
| 109435 | 8/1980 | Japan . |
| 21631 | 2/1981 | Japan .................... 422/176 |
| 76237 | 6/1981 | Japan .................... 422/176 |
| 130217 | 10/1981 | Japan .................... 422/177 |
| 94330 | 6/1982 | Japan . |
| 39774 | 9/1983 | Japan . |

Primary Examiner—Robert J. Warden
Assistant Examiner—D. John Griffith, Jr.
Attorney, Agent, or Firm—Antonelli, Terry, Stout & Kraus

[57] ABSTRACT

A denitration reactor comprises an entrance duct portion into which exhaust gas from a boiler flows, an intermediate duct portion incorporating therein a catalyst layer for denitration, and exit duct portion connected to the intermediate duct portion. The intermediate duct portion is so disposed that an axis thereof is perpendicular to an axis of the entrance duct portion. The reactor further comprises a bent portion for connecting the entrance duct portion to the intermediate duct portion, and a flow controller. The wall of the bent portion is inclined with an inclination angle $\theta$ and extends from a section on which one wall of the intermediate duct portion crosses a surface of a floor of the entrance duct portion to a section on which a plane including opposite wall of the intermediate duct portion crosses a roof of the entrance duct portion. The flow controller is so disposed in the intermediate duct portion that an exhaust gas introduction surface of the flow controller coexists with the floor of the entrance duct portion on the same plane.

6 Claims, 5 Drawing Sheets

DENITRATION REACTOR

FIELD OF THE INVENTION AND RELATED ART STATEMENT

The present invention relates to a denitration reactor for exhaust gas, and more particularly to a denitration reactor in which the exhaust gas flows towards a denitration-catalytic section in the reactor in a controlled manner.

Such reactors are associated, for example, with large boilers installed in thermal power plants. They are designed to remove nitrogen oxides (NOx) from the exhaust gas from a combustion apparatus such as a boiler. The reactor has a denitration catalyst layer disposed within the exhaust gas flow.

The exhuast gas from the combustion apparatus flows through an exhaust gas duct in the denitration reactor. The exhaust gas duct generally comprises an entrance duct portion, an intermediate bent duct portion connected to the entrance duct portion, and an exit duct portion connected to the bent duct portion. The exhaust gas flowing horizontally within the entrance duct portion is bent vertically downwards in the bent duct portion and then directed towards the catalyst layer provided in the bent duct portion. The exhaust gas is denitrated within the catalyst layer and then discharged through the exit duct portion.

In the reactor, it is desirable that the exhaust gas flow satisfies the following two conditions.

(1) The exhaust gas flows towards the catalyst layer in a uniform manner.
(2) The flow of exhaust gas to be introduced into the catalyst layer are the same as that of the exhaust gas flowing within the catalyst layer. Namely, the flow paths of exhaust gas in the catalyst layer are the same as the flow paths of the exhaust gas to be introduced into the catalyst layer.

The reason why the condition (1) must be satisfied resides in the effective use of area of the catalyst layer disclosed to the exhaust gas. If the exhaust gas flows into the catalyst layer in ununiform manner, specific parts of the catalyst layer may be exclusively disclosed to the major part of the exhaust gas. Therefore, a total denitration efficiency of the catalyst becomes worse. Further such specific parts are damaged seriously and then the life time of the catalyst is adversely shortened.

The reason why the condition (2) must be satisfied resides in the following points.

If the exhaust gas contains dust such as fly ash or unburnt particles, when the condition (2) is satisfied, such dust can pass through the catalyst layer without collision between the catalyst and the dust. However, when the condition (2) is not satisfied, the dust may collide with the catalyst to wear it and accumulate on the catalyst to interrupt the flow of the exhaust gas.

In order to satisfy the conditions (1) and (2), it has been proposed to dispose a flow deflector in a part of the bent duct portion upstream side of the catalyst layer. The flow deflector includes a plurality of vanes spaced from each other.

With the use of the deflector, the above-mentioned problems can be solved somewhat. However, even in this case, it is impossible for the exhaust gas flow to completely satisfy the above conditions (1) and (2).

The provision of a flow controller has been further proposed. The flow controller is disposed between the flow deflector and the catalyst layer. Addition of the flow controller can effectively affect the regulation of flow direction of the exhaust gas, but inversely cause an ununiformity in speed distribution of the exhaust gas flow in front of the catalyst layer.

OBJECT AND SUMMARY OF THE INVENTION

Accordingly, a main object of the present invention is to provide a denitration reactor in which an improved flow controller is provided for making the exhaust gas flow completely satisfy the above conditions (1) and (2).

To this end, according to the present invention there is provided a denitration reactor comprising an entrance duct portion into which exhaust gas from a combustion apparatus flows; an intermediate duct portion incorporating therein a catalyst layer for denitration, the intermediate duct portion being so disposed that an axis thereof is perpendicular to an axis of the entrance duct portion; an exit duct portion connected to the intermediate duct portion; a bent portion for connecting the entrance duct portion to the intermediate duct portion, a wall of the bent portion extending with an inclination angle 8 from a section on which one wall of the intermediate duct portion crosses a surface of a floor of the entrance duct portion to a section on which a plane including opposite wall of the intermediate duct portion crosses a roof of the entrance duct portion; and a flow controller disposed in the intermediate duct portion so that an exhaust gas introduction surface of the controller coexists with the floor of the entrance duct portion on the same plane.

Another objects, functions and meritorious advantages of the present invention will be apparent from the following description of the preferred embodiments.

DETAILED DESCRIPTION OF THE PREFERRED EMBODIMENTS

Figure 1:
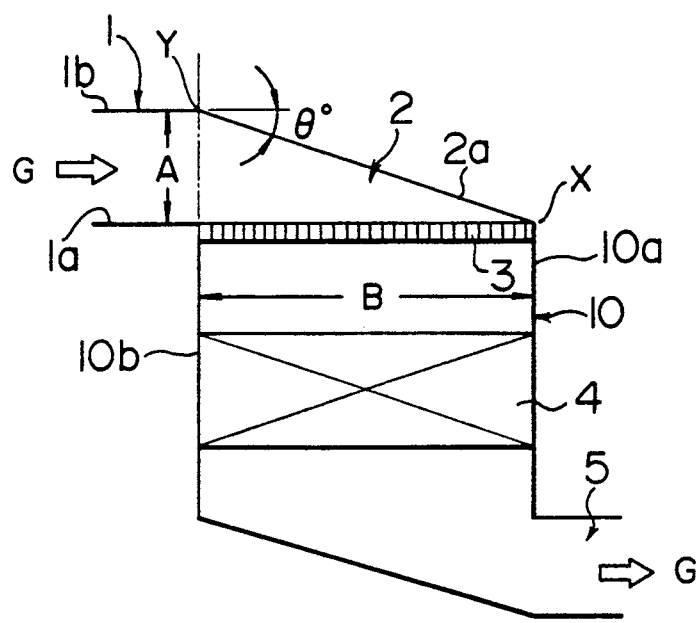
FIG. 1 is a cross sectional view showing a denitration reactor in accordance with one embodiment of the present invention.

Referring to FIG. 1, exhaust gas G from a boiler (not shown) flows through a catalyst layer 4 in an exhaust gas duct to denitrate the exhaust gas. The exhaust gas duct comprises an entrance duct portion 1, an intermediate duct portion 10, and an exit duct portion 5. The entrance duct portion 1 is communicated with the intermediate duct portion 10 through a bent portion 2. The intermediate duct portion 10 incorporates therein the catalyst layer 4. The duct portions 1 and 10 are so arranged that axes of both duct portions cross perpendicular to each other. The exhaust gas G flows from the boiler through these duct portions 1, 2, 10 and 5 in order.

A wall 2a of the bent portion 2 extends from a section X to a section Y. The section X resides in a cross line on which one wall 10a of the intermediate duct portion 10 crosses a surface including a floor 1a of the entrance duct portion 1. The section Y resides in a cross line on which a surface including the other wall 10b of the intermediate duct portion 10 crosses a roof 1b of the entrance duct portion 1.

Hereinunder, an inclination of the wall 2a will be described.

A following equation is obtained to represent an inclination angle of the wall 2a, or an angle $\theta$ between a prolongation of the roof 1b and the wall 2a (the angle $\theta$ will be referred to a bent angle of the bent portion 2 hereinunder).

$$\theta = \tan^{-1}(A/B) \quad (1)$$

where A represents a height of the entrance duct portion 1 and B represents a width of the intermediate duct portion 10 or a width of an introduction part of the catalyst layer 4.

Next a flow control means will be explained hereinunder.

The flow control means is so disposed that an introduction surface thereof and the floor 1a substantially coexist on the same plane. The flow control means is a flow controller 3 of a grid vane type.

Figure 11:
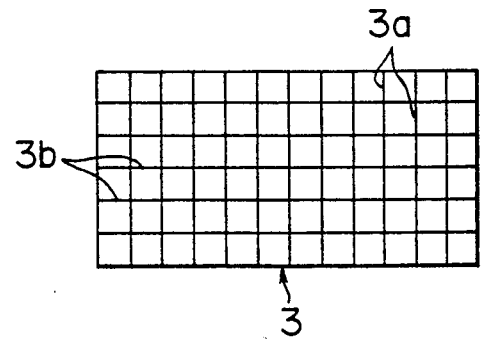
FIG. 11 is a plan view showing a grid vane type flow controller in another embodiment.

The flow controller 3 has, as shown in FIG. 11, a plurality of partitions 3a and 3b which are arranged to cross at a right angle to each other to provide a quadrate grid vane types. The inventors recognize that the following specific arrangement of the controller 3 presents a remarkable high regulation performance after repeated experiments in the exhaust gas flow in the exhaust gas duct.

Figure 3:
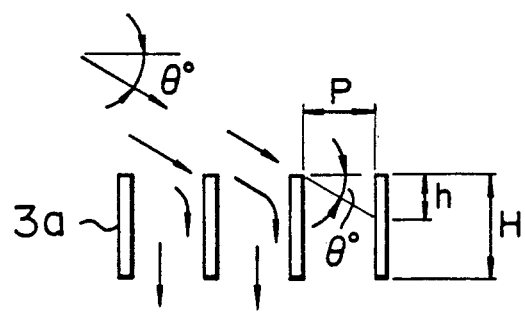
FIG. 3 is an enlarged fragmentary side view showing a grid vane type flow controller shown in FIG. 1.

The controller 3, referring to FIG. 3, satisfies the following equation.

$$H \geq P \tan\theta \quad (2)$$

where H represents a height of the partition 3a or 3b and P represents a distance between two adjacent partitions.

Preferably the following equation can be satisfied.

$$H \geq 3P$$

The partitions are spaced equidistant from each other by P of 6 mm or more, and preferably between 30 mm and 200 mm.

Figure 2:
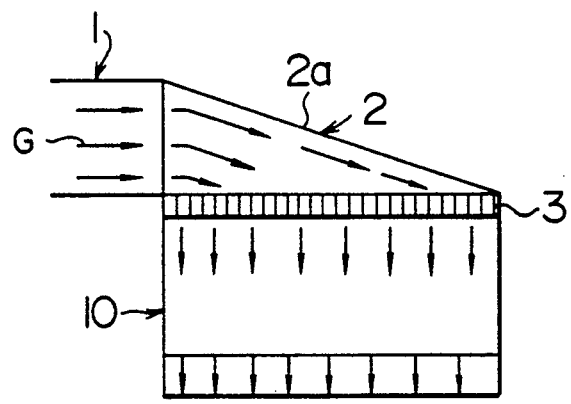
FIG. 2 is a schematic view of the reactor shown in FIG. 1 showing the flow of the exhaust gas.

It is observed and recognized that the exhaust gas G flows within the exhaust gas duct according to the above-mentioned embodiment in the following manner, as shown in FIG. 2. Namely, the exhaust gas G from the entrance duct portion 1 flows within the bent portion 2 along parallel stream lines due to the inclination of the wall 2a, i.e. the bent angle $\theta$. Thereafter, the exhaust gas G flows into the flow controller 3 with maintaining parallel stream lines.

Since the partitions 3a and 3b are spaced equidistant from each other in the controller 3, the flow of exhaust gas from the controller 3 is so controlled that it is directed downwards and the stream lines thereof conform to the exhaust gas paths in the catalyst layer 4. Further, it is also recognized that the flow speed distribution of the exhaust gas is uniformized in front of the catalyst layer 4.

According this, the catalyst layer 4 can use a full area thereof for denitration. Further since the dust contained in the exhaust gas does not collide with the catalyst layer 4, it becomes possible to prevent the catalyst layer 4 from being worn, thereby prolonging the life time of the catalyst layer 4.

The reason why the above meritorious results can be obtained will be considered hereinunder.

Since the wall 2a of the bent portion 2, as shown in FIG. 1 extends from the section X to the section Y with satisfying the above equation (1), the exhaust gas G coming from the entrance duct portion 1 in parallel stream lines can be changed in the direction thereof in the bent portion 2 without any large turbulence.

Further, since the flow controller 3 is so disposed that the introduction surface of thereof coexists with the floor 1a on the same plane so as to remove a space between the height levels of the introduction surface of the flow controller 3 and of the floor 1a of the entrance duct 1, it becomes possible to prevent the exhaust gas from stagnating and swirling in such space.

The controller 3 has uniformed meshes to introduce the exhaust gas into the respective meshes in a uniformed manner. Therefore, the flow rates per unit time of the exhaust gas passing through the respective meshes can be also uniformed and then the speed distribution of the exhaust gas in front of the catalyst layer can be also uniformed.

Further, as apparent from FIG. 2, in order that the flow direction of the exhaust gas to be introduced into the controller 3 with the inclination angle $\theta$ can be fully changed in the catalyst layer 4, such layer must have an exhaust gas flow path having a length h or more, which is represented by $P \cdot \tan\theta$. The length H of the exhaust gas flow path in the catalyst layer does satisfy the equation (2). Namely the path length H is, of course, greater than the length h. Accordingly, the exhaust gas can fully and smoothly change the flow direction thereof in the catalyst layer.

The prior arts will be described hereinunder in comparison with this embodiment.

Figure 7:
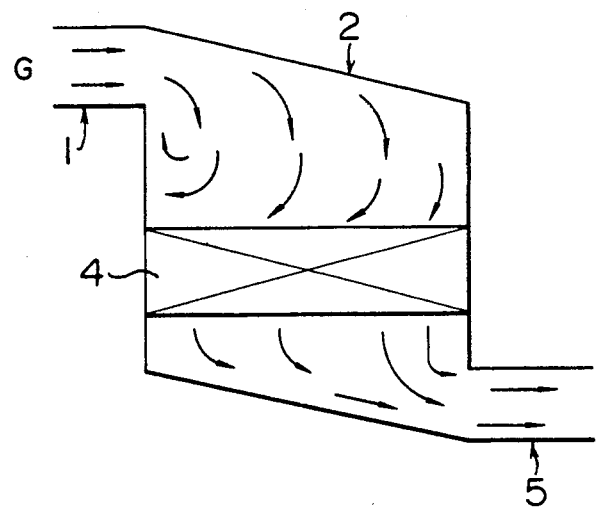
Figure 8:
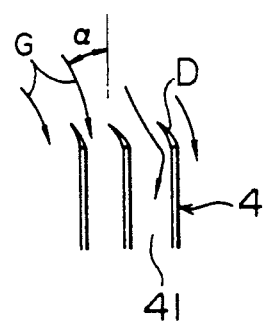
FIGS. 8 and 9 are enlarged fragmentary views showing a catalyst layer.
Figure 9:
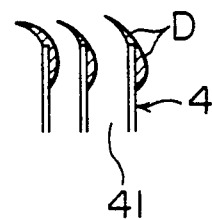

In the prior art shown in FIG. 7 in which there is no flow controller 3, the exhaust gas G swirls in the bent portion 2. The exhaust gas G is introduced into the paths 41 in the catalyst layer 4 with an inclination angle $\alpha$ in respect to the paths 41 (FIG. 8). The above conditions (1) and (2) can be hardly satisfied. As a result, the dust D contained in the exhaust gas collides with catalyst to wear it. Further the dust D accumulates on the catalyst 4 to restrict the flow of the exhaust gas. When the accumulation goes on as shown in FIG. 9, the volume of the accumulated dust D increases and then it may close an introduction surface of the catalyst layer.

Figure 6:
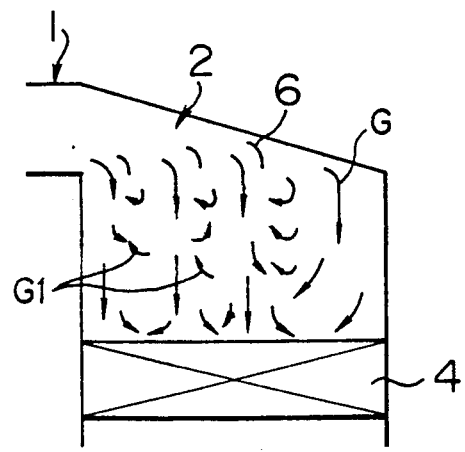

Referring to FIG. 6, another prior art is shown in which flow deflecting vanes 6 are provided upstream side of the catalyst layer 4. In this arrangement, a part of the exhaust gas comes off from the remaining part thereof and stays downstream side of the deflecting vanes 6 as vortexes G1. The vortexes G1 disadvantageously affects the exhaust gas flow in front of the catalyst layer to direct the exhaust gas thereto in an inclined manner. In this arrangement, it is also impossible to satisfy the above conditions (1) and (2).

Figure 5:
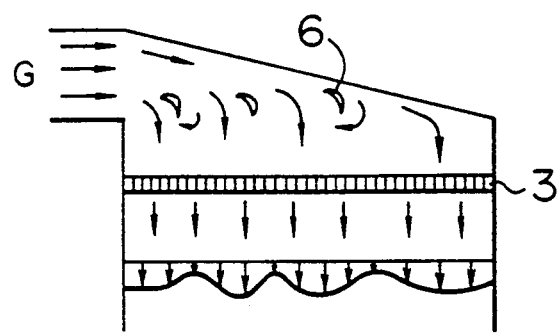

In still another prior art shown in FIG. 5, a flow controller 3 is provided between the flow deflecting vanes 6 and the catalyst layer 4. The flow controller 3 can restrict the generation of vortexes G1 in the vicinity of the catalyst layer 4. However, the vortexes generated in the vicinity of the controller 3 disadvantageously affect the exhaust gas in front of the catalyst layer 4 to disturb the speed distribution of the exhaust gas to be introduced into the catalyst layer 4. Accordingly it is also impossible to satisfy the conditions (1) and (2).

Figure 4:
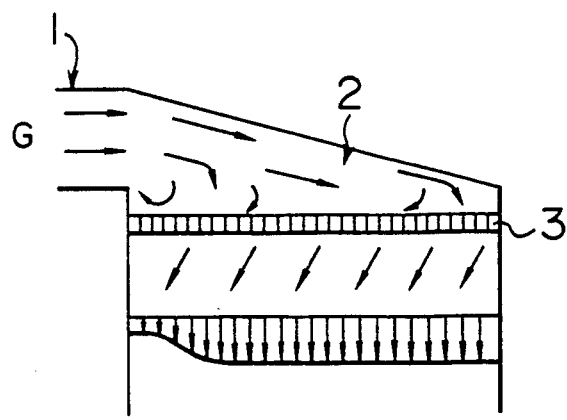
FIGS. 4 to 7 are cross sectional views showing prior art denitration reactors, respectively.

FIG. 4 shows the prior art in which the deflecting vanes 6 is removed from the bent portion 2. The flow controller 3 is disposed somewhat closer to the bent portion than that in FIG. 5. The flow controller 3 can prevent the generation of vortexes in front of the catalyst layer, which is caused by the separation of the exhaust gas. However, the exhaust gas from the controller 3 is directed to the catalyst layer 4 in an inclined manner. Further, in a part of the bent portion 2 in vicinity of the entrance duct portion 1, flow of the exhaust gas is extremely restricted to decrease the speed thereof. Therefore, the speed distribution of the exhaust gas becomes ununiform.

Figure 12:
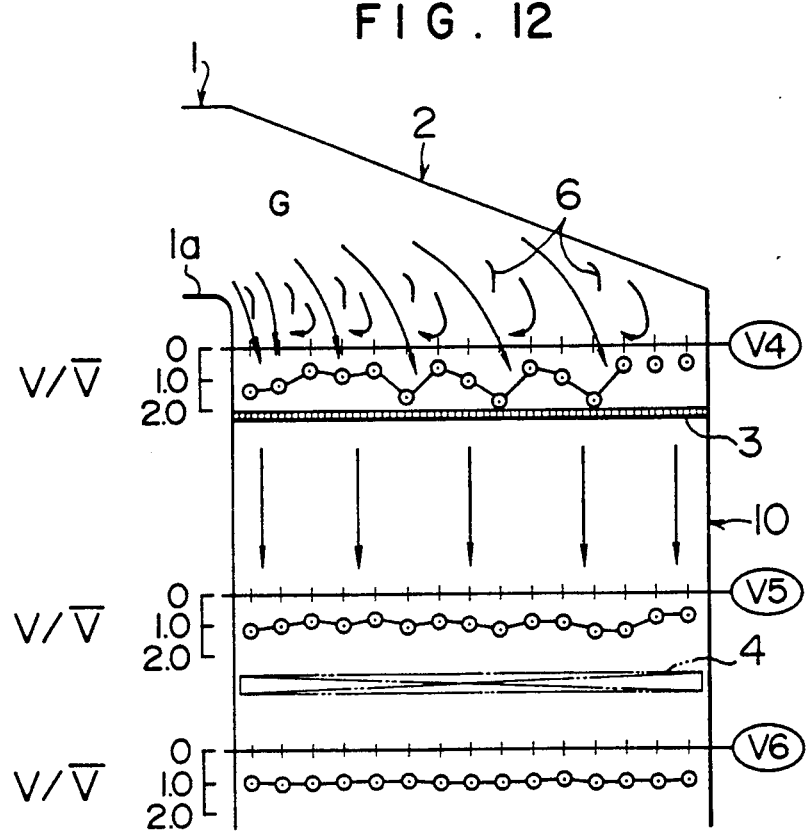
FIGS. 12 and 13 are diagrams showing speed distributions of exhaust gas in prior art reactors, respectively.
Figure 13:
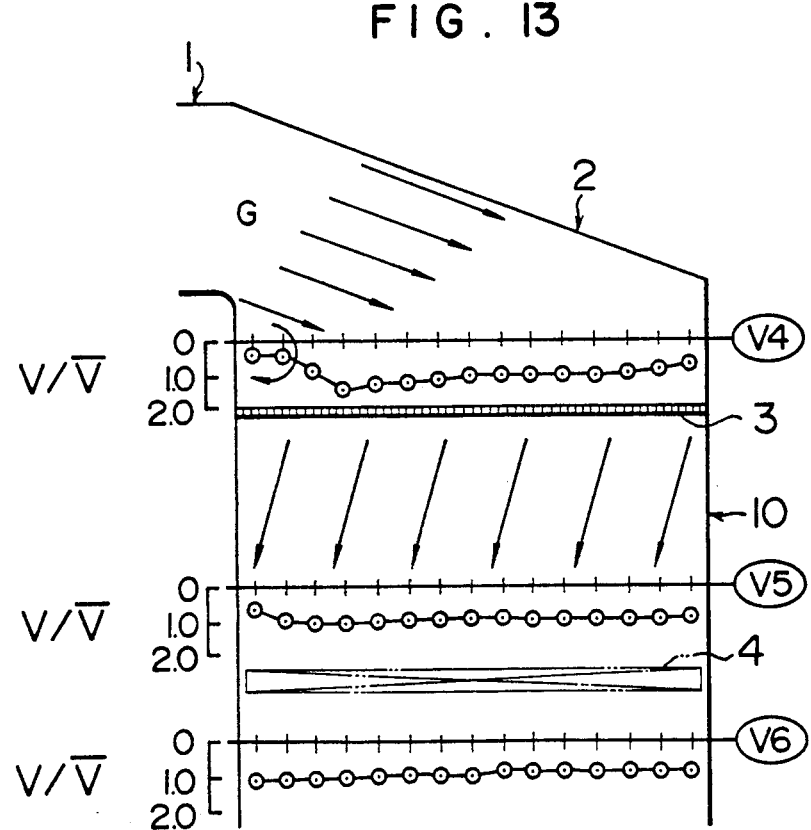
Figure 14:
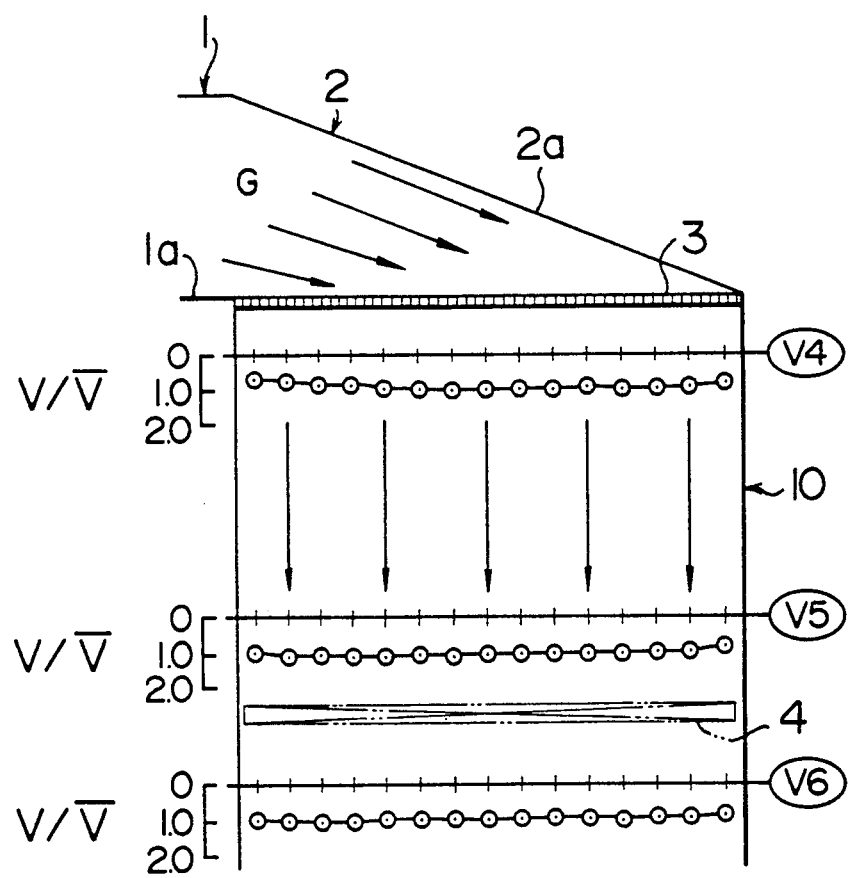
FIG. 14 is a diagram showing a speed distributions of exhaust gas in the reactor shown in FIG. 1.

The characteristics of flow of the exhaust gas in the arrangements in FIGS. 5 and 4 (prior arts), and FIG. 1 (present invention) will be apparent from FIGS. 12 to 14, respectively. In the drawings, V4 to V6 represent the respective control surfaces of the exhaust gas flow. $V/\overline{V}$ represents the fluctuation in speed of exhaust gas in the above control surfaces, respectively. The closer the value of $V/\overline{V}$ converges upon 1, the more the speed distribution becomes uniformed.

Referring to FIG. 12, in the arrangement shown in FIG. 5, it is found that the exhaust gas flow in front of the flow controller 3 is disturbed. The controller 3 can not dissolve such disturbance fully and then such disturbance is still remained even in the introducing surface of the catalyst layer.

In the arrangement shown in FIG. 4, as described above, it is apparent from FIG. 13 that the exhaust gas is extremely restricted to decrease the speed thereof at the part of the bent portion in vicinity of the entrance duct portion 1 and that the exhaust gas from the flow controller is inclined as a whole and is introduced into the catalyst layer.

To the contrary, according to the above-mentioned embodiment, as shown in FIG. 14, an ideal flow of the exhaust gas can be obtained. Namely, the speed distribution of the exhaust gas from the flow controller 3 is substantially uniformed completely. Further the flow direction of the exhaust gas is changed downwards, the stream lines of which correspond to the exhaust gas flow paths in the catalyst layer.

The characteristics of flow of exhaust gas in the arrangements in FIGS. 5 and 4 (prior arts), and FIG. 1 (present invention) will be numerically expressed in the following table. The test numbers 1 to 3 correspond to the arrangements of FIGS. 12 to 14, respectively.

| TEST NO. | FLUCTUATION COEFFICIENT ξ (%) | | |
|---|---|---|---|
| | V4 | V5 | V6 |
| 1 | 37.1 | 15.9 | 8.2 |
| 2 | 37.1 | 15.9 | 8.2 |
| 3 | 18.1 | 8.4 | 8.7 |

Where a fluctuation coefficient ξ is represented by the following equation:

$$\xi = V/\overline{V} \times 100$$

Figure 10:
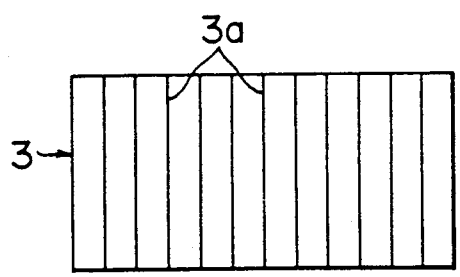
FIG. 10 is a plan view showing the single vane type flow controller shown in FIG. 1.

In the above-mentioned embodiment, the flow controller 3 is a grid vane type one, as shown in FIG. 11. However, a single vane type controller as shown in FIG. 10 may cause the substantially same effects and the meritorious advantages as that shown in FIG. 11. The single flow controller 3 has a simple construction thereof and then enjoy the cheap cost of production thereof.

What is claimed is:

1. A denitration reactor comprising:
   an entrance duct portion into which exhaust gas from a combustion apparatus flows, said extrance duct portion extending horizontally along an axis of said entrance duct portion and said entrance duct portion having a floor and a roof opposite to said floor;
   an intermediate duct portion incorporating therein a catalyst layer for denitration, said intermediate duct portion being disposed vertically so that an axis thereof is perpendicular to the axis of said entrance duct portion and so that exhaust gas from said entrance duct portion flows downwardly therein, said intermediate duct portion having opposite side walls;
   a bent portion for connecting said entrance duct portion to one end of said intermediate duct portion, a wall of said bent portion extending with an inclination angle θ from a section on which one wall of the side walls of said intermediate duct portion crosses a plane including an inner surface of the floor of said entrance duct portion to a section on which a plane including the other of the side walls of said intermediate duct portion crosses the roof of said entrance duct portion;
   a flow controller disposed in one end of said intermediate duct portion so that an exhaust gas introduction surface of said controller coexists with said floor of said entrance duct portion on the same plane; and
   an exit duct portion connected to the other end of said intermediate duct portion.

2. A denitration reactor according to claim 1, wherein said flow controller is of the grid vane type wherein two groups of parallel vertical vanes are arranged to cross each other.

3. A denitration reactor according to claim 1, wherein said flow controller is of the single vane type in which a plurality of parallel vanes are arranged vertically.

4. A denitration reactor according to claim 2, wherein said flow controller satisfies the following condition:

$$H \geq P \tan\theta$$

where H represents a height of vane of said grid vane type flow controller and P represents a pitch between said vanes thereof.

5. A denitration reactor according to claim 3, wherein said flow controller satisfies the following condition:

$$H \geq P \tan\theta$$

where H represents a height of a vane of said single vane type flow controller and P represents a pitch between said vanes thereof.

6. A denitration reactor according to claim 1, wherein said inclination angle $\theta$ satisfies the following equation:

$$\theta = \tan^{-1}(A/B)$$

wherein A represents a height of the entrance duct portion and B represents a width of the intermediate duct portion or a width of an introduction part of the catalyst layer.

* * * * *